US012277900B2

(12) United States Patent
Kwon et al.

(10) Patent No.: US 12,277,900 B2
(45) Date of Patent: Apr. 15, 2025

(54) DISPLAY DEVICE HAVING A VOLTAGE REGULATING CIRCUIT FOR OUTPUTTING TO PIXEL CIRCUIT

(71) Applicant: LG Display Co., Ltd., Seoul (KR)

(72) Inventors: Ki Tae Kwon, Paju-si (KR); Yong Hwa Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/367,647

(22) Filed: Sep. 13, 2023

(65) Prior Publication Data

US 2024/0212591 A1 Jun. 27, 2024

(30) Foreign Application Priority Data

Dec. 22, 2022 (KR) ........................ 10-2022-0181466

(51) Int. Cl.
*G09G 3/3208* (2016.01)

(52) U.S. Cl.
CPC ..... *G09G 3/3208* (2013.01); *G09G 2310/027* (2013.01); *G09G 2320/0233* (2013.01); *G09G 2320/0247* (2013.01); *G09G 2330/021* (2013.01)

(58) Field of Classification Search
CPC .................................................... G09G 3/3208
USPC ............................................................ 345/55
See application file for complete search history.

(56) References Cited

U.S. PATENT DOCUMENTS

| | | | | |
|---|---|---|---|---|
| 2002/0000964 A1 | 1/2002 | Sumiya | | |
| 2006/0043951 A1 | 3/2006 | Oswald et al. | | |
| 2010/0123738 A1* | 5/2010 | Matsukawa | G09G 3/3648 | 345/89 |
| 2010/0231617 A1* | 9/2010 | Ueda | G09G 3/3648 | 345/87 |
| 2014/0063079 A1* | 3/2014 | Lee | G09G 3/2003 | 345/77 |
| 2020/0211457 A1* | 7/2020 | Kim | G09G 3/3233 | |
| 2021/0119533 A1 | 4/2021 | Liang et al. | | |

FOREIGN PATENT DOCUMENTS

| | | |
|---|---|---|
| KR | 10-2017-0049735 A | 5/2017 |
| KR | 10-2020-0142818 A | 12/2020 |

* cited by examiner

*Primary Examiner* — Long D Pham
(74) *Attorney, Agent, or Firm* — Birch, Stewart, Kolasch & Birch, LLP

(57) ABSTRACT

A power circuit can include a direct current to direct current converter configured to output a first voltage; a digital-to-analog converter configured to convert input data to an analog voltage and output a second voltage; and a voltage regulating circuit configured to receive the first voltage and the second voltage as inputs and output a voltage in which the second voltage is added to the first voltage, and reduce a slope of the voltage. Also, the input data to the digital-to-analog converter is updated during one horizontal period of a display device, and the voltage regulating circuit is further configured to commonly supply the voltage to pixels of the display device.

18 Claims, 16 Drawing Sheets

DISPLAY DEVICE HAVING A VOLTAGE REGULATING CIRCUIT FOR OUTPUTTING TO PIXEL CIRCUIT

CROSS-REFERENCE TO RELATED APPLICATION

This application claims priority under 35 U.S.C. § 119(a) to Korean Patent Application No. 10-2022-0181466, filed in the Republic of Korea on Dec. 22, 2022, the entirety of which is incorporated by reference into the present application.

BACKGROUND

1. Field

The present disclosure relates to a power circuit capable of varying the power required to drive a display device, and the display device including the power circuit.

2. Discussion of Related Art

An organic light-emitting display device an includes an organic light-emitting diode (hereinafter referred to as "OLED") which emits light by itself (e.g., no backlight unit is needed), and has advantages of fast response speed, high luminous efficiency, improved brightness, and wide viewing angles. Thus, the organic light-emitting display device has a fast response speed, excellent luminous efficiency, improved brightness, better viewing angles, and has excellent contrast ratio and color reproducibility since it can express black grayscales in full black (e.g., true black).

The organic light-emitting display device does not require a backlight unit, and can be implemented on a plastic substrate, a thin glass substrate, or a metal substrate, which is a flexible material. Accordingly, flexible displays can be implemented with organic light-emitting display devices.

In an organic light emitting display device, the luminance of the pixels may not reach a target luminance within one frame period when power is initially supplied (e.g., after being powered on) and an image begins to be displayed, and may reach the target luminance after several frames have elapsed. As the amount of transition or grayscale change in pixel data increases, a response speed is slower. A slow response speed results from a decrease in a peak luminance value and a gradual change in the luminance of the pixel within a light emission period of the pixel, which can impair image quality. For example, when the images displayed by the display device experience a large change (e.g., a transition from a dark scene to a bright scene or from a bright scene to a dark scene, etc.), the luminance of the screen can experience a noticeable flicker phenomenon or an undesirable change in luminance, which may be noticeable by a viewer and can impair image quality.

SUMMARY OF THE DISCLOSURE

The present disclosure has been made in an effort to address aforementioned needs and/or drawbacks.

The present disclosure provides a power circuit capable of improving response characteristics of pixels and improving image quality, and a display device including the power circuit.

It should be noted that objects of the present disclosure are not limited to the above-described objects, and other objects of the present disclosure will be apparent to those skilled in the art from the following descriptions.

A power circuit according to one embodiment of the present disclosure includes: a DC-DC converter configured to output one or more first voltages having different voltage levels; a digital-to-analog converter configured to convert input data to an analog voltage and output a second voltage; and a voltage regulating circuit configured to receive the first voltage and the second voltage as inputs and to output a voltage in which the second voltage is added to the first voltage, and to reduce a slope of the voltage. The input data to the digital-to-analog converter can be updated in units of one horizontal period of a display device. The voltage output from the voltage regulating circuit can be commonly applied to pixels of the display device.

The voltage regulating circuit can include: an adder configured to receive the first voltage and the second voltage as inputs; a delay configured to delay an output from the adder; and an output buffer configured to transfer an output voltage from the delay to the pixels. The delay can include a multi-RC delay circuit including a plurality of resistors and a plurality of capacitors.

The voltage regulating circuit can include: an adder configured to receive the first voltage and the second voltage as inputs; a delay connected to an input terminal of the adder to which the second voltage is applied; and an output buffer configured to transfer an output voltage from the adder to the pixels. The delay can include a multi-RC delay circuit including a plurality of resistors and a plurality of capacitors.

A display device according to one embodiment of the present disclosure includes: a display panel on which a plurality of pixel circuits are disposed; a controller configured to output compensation gain data; a digital-to-analog converter configured to convert the compensation gain data to an analog voltage and to output a second voltage; a DC-DC converter configured to output a first voltage; and a voltage regulating circuit configured to receive the first voltage and the second voltage as inputs and to output a voltage in which the second voltage is added to the first voltage, and to reduce a slope of the voltage. The compensation gain data is updated in a unit of one horizontal period. The voltage output from the voltage regulating circuit is commonly applied to the pixel circuits.

The pixel circuits can receive a pixel driving voltage, a reference voltage, and a cathode voltage. The voltage output from the voltage regulating circuit can be at least one of the pixel driving voltage, the reference voltage, and the pixel reference voltage.

The controller can gradually increase the compensation gain data in a unit of one horizontal period during one frame period when a frame grayscale value increases. The voltage regulating circuit can increase the voltage supplied to the pixel circuits in a unit of one horizontal period within the one frame period.

The output voltage from the voltage regulating circuit can follow an exponential function slope curve between 1.8 and 2.6 during a fluctuation section of the output voltage.

The controller can gradually decrease the compensation gain data in a unit of one horizontal period during one frame period when the frame grayscale value decreases. The voltage regulating circuit can decrease the voltage supplied to the pixel circuits in a unit of one horizontal period within the one frame period. The output voltage from the voltage regulating circuit can follow an exponential function slope curve between 1.8 and 2.6 during a fluctuation section of the output voltage.

The controller can change a slope of the output voltage of the voltage regulating circuit during a fluctuation section of the output voltage according to an amount of change between grayscales in the frame grayscale value. The output voltage of the voltage regulating circuit can increase by following a slope of a 2.2 exponential function when the frame grayscale value is changed from a lowest grayscale value to a highest grayscale value. The output voltage of the voltage regulating circuit can increase by following a slope of an exponential function having a value greater or lesser than a 2.2 when the frame grayscale value is changed from a lowest grayscale value to an intermediate grayscale value.

According to the present disclosure, by controlling at least one of the voltages used to drive the pixels in a unit of one horizontal period, the fluctuation of the gate-source voltage of the driving element for driving the light emitting element can be prevented, resulting in prevention of a luminance decay phenomenon of the pixels and improvement of the response characteristics of the pixels to improve the image quality.

According to the present disclosure, a voltage variation in voltage fluctuation sections is controlled with a voltage that follows an exponential function curve, thereby improving the image quality of the pixels.

According to the present disclosure, the luminance of the pixels can be adjusted using a compensation gain that is updated by a timing controller in a unit of one horizontal period, thereby improving the response characteristics of the pixels.

Effects which can be achieved by the present disclosure are not limited to the above-mentioned effects. For example, other objects that are not mentioned above can be obviously understood by those skilled in the art to which the present disclosure pertains from the following description.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, in which.

DETAILED DESCRIPTION OF THE EMBODIMENTS

Figure 1:
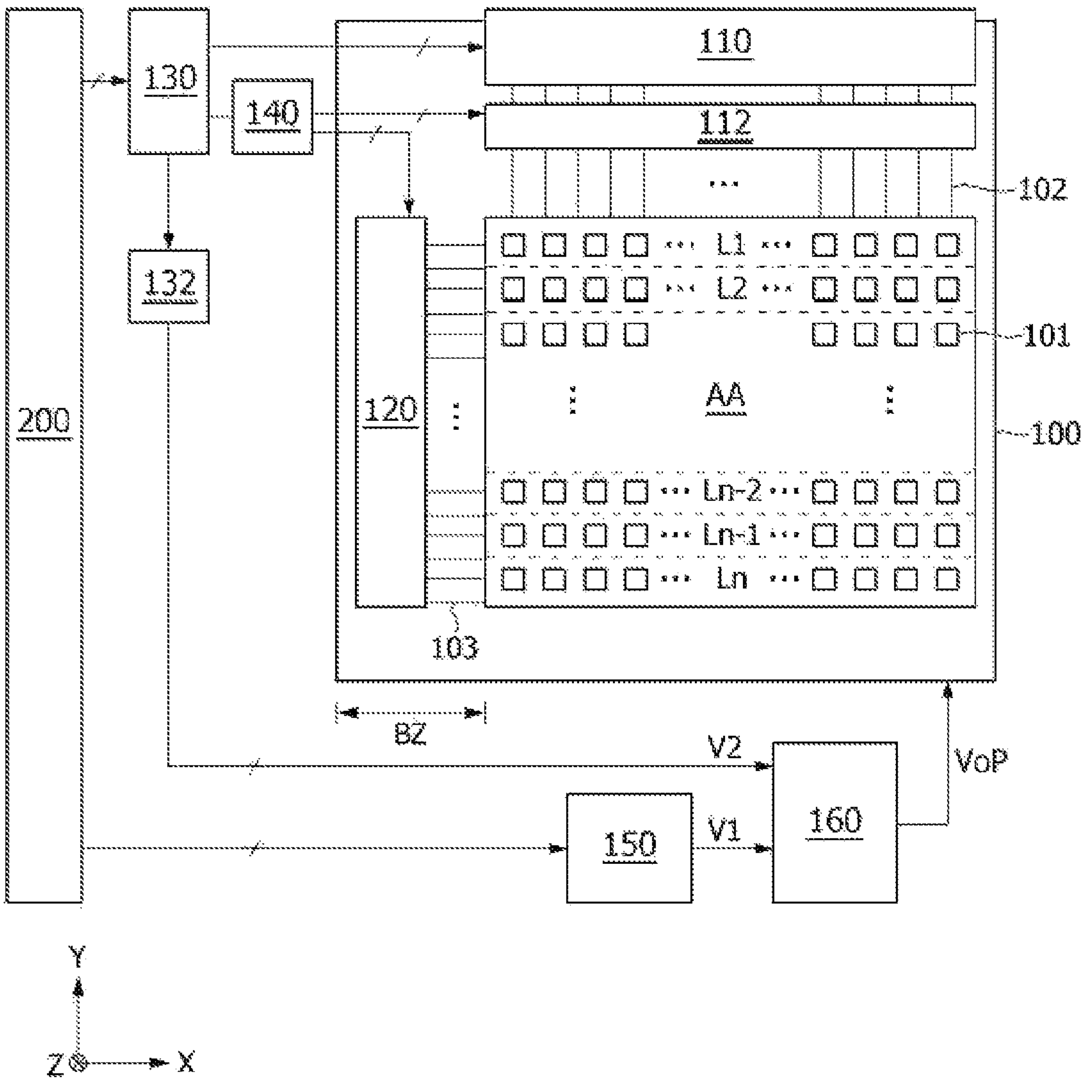
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure can be defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as “comprising,” “including,” “having,” etc. used herein are generally intended to allow other components to be added unless the terms are used with the term “only.” Any references to singular can include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components can be interposed between them, unless “immediately” or “directly” is used.

When a temporal antecedent relationship is described, such as "after," "following," "next to," "before," or the like, it may not be continuous on a time base unless "immediately" or "directly" is used.

The terms "first," "second," and the like can be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In a display device of the present disclosure, a pixel circuit and a gate driving circuit can include a plurality of transistors. Transistors can be implemented as oxide thin film transistors (oxide TFTs) including an oxide semiconductor, low temperature polysilicon (LTPS) TFTs including low temperature polysilicon, or the like. Further, each of the transistors can be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS)), since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In situation of an n-channel transistor, a gate-on voltage can be a gate high voltage VGH, and a gate-off voltage can be a gate low voltage VGL. In situation of a p-channel transistor, a gate-on voltage can be a gate low voltage VGL, and a gate-off voltage can be a gate high voltage VGH.

Hereinafter, various embodiments of the present disclosure will be described in detail with reference to the accompanying drawings.

Figure 2:
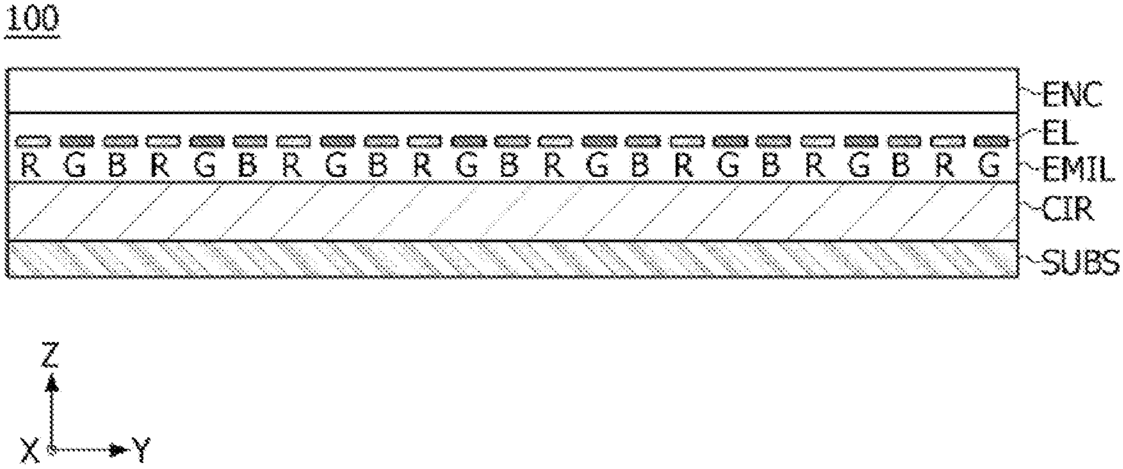
FIG. 2 is a cross-sectional view illustrating a cross-sectional structure of the display panel shown in FIG. 1 according to an embodiment of the present disclosure.
Figure 3:
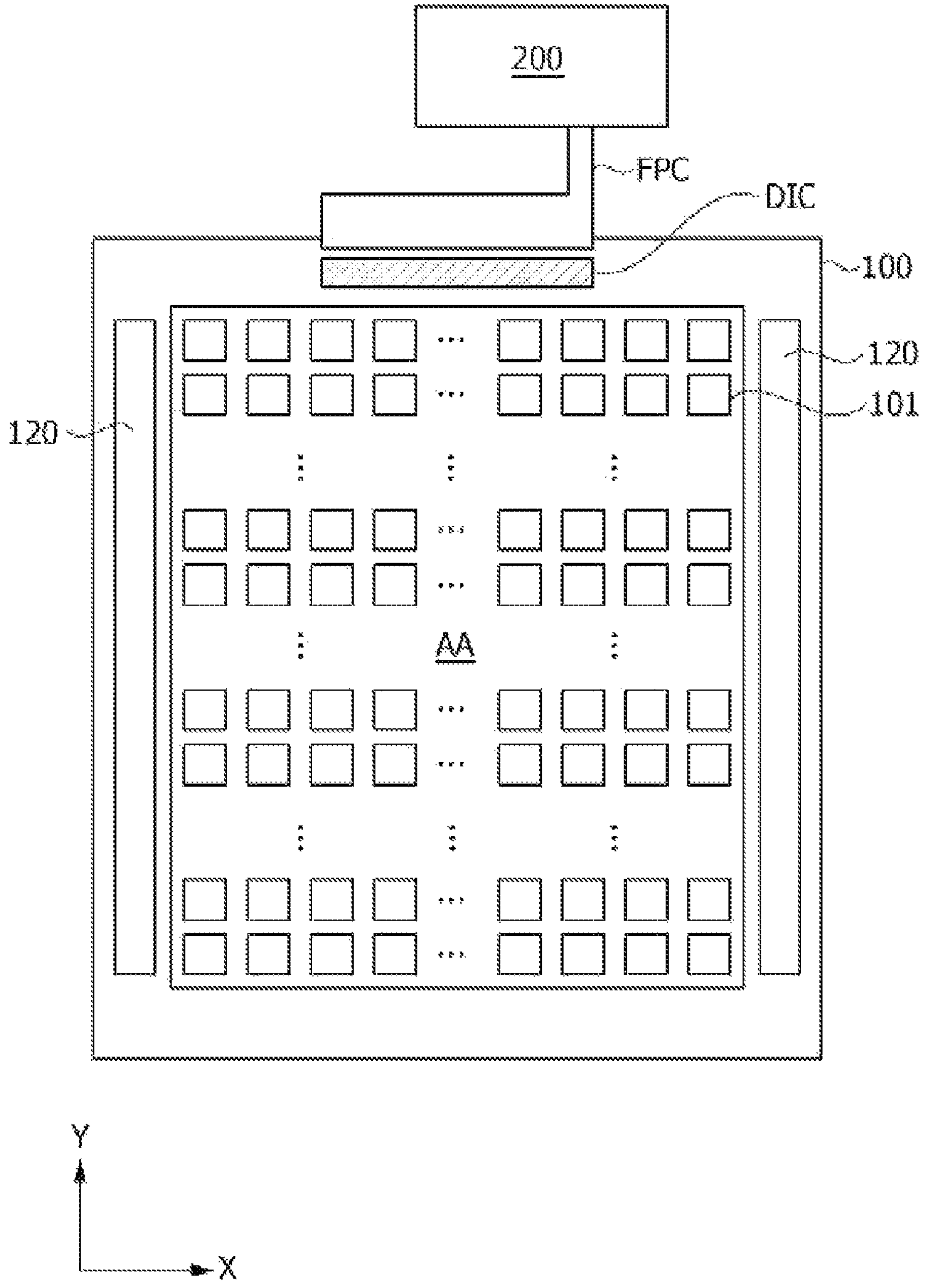
FIG. 3 is a diagram schematically illustrating a mobile terminal according to an embodiment of the present disclosure.

FIG. 1 is a block diagram illustrating a display device according to one embodiment of the present disclosure. FIG. 2 is a cross-sectional view illustrating a cross-sectional structure of the display panel shown in FIG. 1 according to an embodiment of the present disclosure. FIG. 3 is a diagram schematically illustrating a mobile terminal according to an embodiment of the present disclosure.

Referring to FIGS. 1 to 3, the display device according to an embodiment of the present disclosure includes a display panel 100, a display panel driving circuit for writing pixel data to pixels of the display panel 100, a power supply 150 for generating power for driving the pixels and the display panel driving circuit, and a voltage regulator 160.

The display panel 100 can be a panel having a rectangular structure with a length in the X-axis direction, a width in the Y-axis direction, and a thickness in the Z-axis direction. A display area AA of the display panel 100 includes a pixel array for displaying an input image thereon. The pixel array includes a plurality of data lines 102, a plurality of gate lines 103 intersected with the data lines 102, and pixels arranged in a matrix form. The display panel 100 can further include power lines commonly connected to the pixels. The power lines can be commonly connected to pixel circuits to supply a voltage for driving the pixels 101 to the pixels 101.

Each of the pixels 101 can be divided into a red sub-pixel, a green sub-pixel, and a blue sub-pixel for color implementation. Each of the pixels can further include a white sub-pixel. Each of the sub-pixels includes a pixel circuit for driving a light emitting element. Each of the pixel circuits is connected to the data lines, the gate lines, and the power lines.

The pixels can be disposed as real color pixels and pentile pixels. A pentile pixel can realize a higher resolution than the real color pixel by driving two sub-pixels having different colors as one pixel 101 through the use of a preset pixel rendering algorithm. Pixel rendering algorithms can compensate for insufficient color representation in each pixel with the color of light emitted from an adjacent pixel.

The pixel array includes a plurality of pixel lines L1 to Ln. Each of the pixel lines L1 to Ln includes one line of pixels arranged along the line direction (X-axis direction) in the pixel array of the display panel 100. Sub-pixels arranged in one pixel line share the gate lines 103. Sub-pixels arranged in the column direction Y along a data line direction share the same data line 102. One horizontal period is a time obtained by dividing one frame period by the total number of the pixel lines L1 to Ln.

The display panel 100 can be implemented as a non-transmissive display panel or a transmissive display panel. The transmissive display panel can be applied to a transparent display device in which an image is displayed on a screen and an actual background or objects behind the display device are visible by looking through the display device. The display panel 100 can be manufactured as a flexible display panel. The display panel can be implemented as a flexible display panel.

The cross-sectional structure of the display panel 100 can include a circuit layer CIR, a light-emitting element layer EMIL, and an encapsulation layer ENC stacked on a substrate SUBS, as shown in FIG. 2.

The circuit layer CIR can include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer.

The light-emitting element layer EMIL can include a light-emitting element driven by the pixel circuit. The light-emitting element can include a light-emitting element of a red sub-pixel, a light-emitting element of a green sub-pixel, and a light-emitting element of a blue sub-pixel. The light-emitting element layer EMIL can further include a light-emitting element of white sub-pixel. The light-emitting element layer EMIL corresponding to each of the sub-pixels can have a structure in which a light-emitting element and a color filter are stacked. The light-emitting elements EL in the light-emitting element layer EMIL can be covered by multiple protective layers including an organic film and an inorganic film.

The encapsulation layer ENC covers the light-emitting element layer EMIL to seal the circuit layer CIR and the light-emitting element layer EMIL. The encapsulation layer ENC can also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL can be effectively blocked.

A touch sensor layer can be formed on the encapsulation layer ENC, and a polarizing plate or a color filter layer can be disposed thereon. The touch sensor layer can include capacitive touch sensors that sense a touch input based on a change in capacitance before and after the touch input. The touch sensor layer can have metal wiring patterns and insulating films that form the capacitance of the touch sensors. The insulating films can insulate an area where the metal wiring patterns intersect and can planarize the surface of the touch sensor layer. The polarizing plate can improve visibility and contrast ratio by converting the polarization of external light reflected by metal in the touch sensor layer and the circuit layer. The polarizing plate can be implemented as a circular polarizing plate or a polarizing plate in which a linear polarizing plate and a phase retardation film are bonded together. A cover glass can be adhered to the polarizing plate. The color filter layer can include red, green, and blue color filters. The color filter layer can further include a black matrix pattern. The color filter layer can replace the polarizing plate by absorbing a part of the wavelength of light reflected from the circuit layer and the touch sensor layer, and increase the color purity of an image reproduced in the pixel array.

The power supply 150 adjusts the level of a direct current input voltage from a host system 200 to output a first voltage V1 necessary to drive the pixel array of the display panel 100 and the display panel driving circuit. The power supply 150 can include a direct current to direct current converter (DC-DC converter). The DC-DC converter can include a charge pump, a regulator, a buck converter, a boost converter, and the like. The first voltage V1 output from the DC-DC converter can include a constant voltage (or DC voltage), such as a gamma reference voltage, a gate-on voltage, a gate-off voltage, a pixel driving voltage, a cathode voltage, a reference voltage, etc. The gamma reference voltage is supplied to the data driver 110. The dynamic range of the data voltage output from the data driver 110 is determined by the voltage range of the gamma reference voltage. The dynamic range of the data voltage is a voltage range between the highest grayscale voltage and the lowest grayscale voltage, whose voltage level is selected by the grayscale value of the pixel data.

The gate-on voltage and the gate-off voltage are supplied to a level shifter 140 and the gate driver 120. The voltages, such as the pixel driving, the cathode voltage and the reference voltage, are supplied to the pixels 101 via the power lines commonly connected to the pixels 101.

The voltage regulator 160 can vary each of the voltages output from the power supply 150 under control of the timing controller 130. The voltage regulator 160 can vary each of the voltages output from the power supply 150 in a unit of one horizontal period of the display panel 100. For example, the voltage regulator 160 can dynamically change the voltages output from the power supply 150 during one horizontal period or during each horizontal period of the display panel 100. An output voltage VoP from the voltage regulator 160 can be supplied to the pixels of the display panel and the display panel driving circuit.

The display panel driving circuit writes pixel data of an input image to the pixels of the display panel 100 under the control of the timing controller 130. The display panel driving circuit includes the data driver 110 and the gate driver 120. The display panel driving circuit can further include a de-multiplexer array 112 disposed between the data driver 110 and the data lines 102.

The de-multiplexer array 112 sequentially supplies the data voltages output from channels of the data driver 110 to the data lines 102 using a plurality of de-multiplexers DEMUX. Each of the de-multiplexers can include a number of switch elements disposed on the display panel 100. When the de-multiplexers are disposed between the output terminals of the data driver 110 and the data lines 102, the number of channels of the data driver 110 can be reduced. The de-multiplexer array 112 can be omitted.

The display panel driving circuit can further include a touch sensor driver for driving touch sensors. The data driver 110 and the touch sensor driver can be integrated into one drive IC (Integrated Circuit).

The data driver 110 receives the pixel data of the input image received as a digital signal from the timing controller 130 and outputs the data voltage. The data driver 110 converts the pixel data of the input image to a gamma compensation voltage at each frame period in a normal driving mode using a digital to analog converter (hereinafter referred to as a "DAC") embedded in each channel of the data driver 110, and outputs the data voltage. The gamma reference voltage is divided by a voltage divider circuit into the gamma compensation voltage for each grayscale. The gamma compensation voltage for each grayscale is provided to the DAC in the data driver 110. The data voltage is output via an output buffer from each of the channels of the data driver 110.

The gate driver 120 can be formed in the circuit layer CIR on the display panel 100 together with the TFT array of the pixel array and the wiring. The gate driver 120 can be disposed on a bezel area which is non-display area of the display panel 100, or at least a portion thereof can be distributedly disposed in the pixel array in which the input image is reproduced. The gate driver 120 can be disposed in the bezel area on both sides of the display panel 100 with the display area AA of the display panel interposed therebetween and can supply gate pulses from the both sides of the gate lines 103 in a double feeding method. In another embodiment, the gate driver 120 can be disposed on at least one of the left or right bezel of the display panel 100 to supply gate signals to the gate lines GL in a single feeding method. The gate driver 120 sequentially outputs pulses of the gate signals to the gate lines 103 under the control of the timing controller 130. The gate driver 120 can sequentially supply the gate signals to the gate lines 103 by shifting the pulses of the gate signals using shift registers.

The gate driver 120 can include a plurality of shift registers that output the pulses of the gate signals. For the pixel circuit illustrated in FIG. 5, the gate driver 120 can include a first shift register that sequentially outputs a first gate signal SCAN1, a second shift register that sequentially outputs a second gate signal SCAN2, and a third shift register that sequentially outputs a third gate signal EM.

The timing controller 130 receives from the host system 200 digital video data of the input image and timing signals synchronized with this data. The timing signal can include a vertical synchronization signal Vsync, a horizontal synchronization signal Hsync, and a data enable signal DE. Since a vertical period and a horizontal period can be known by counting the data enable signal DE, the vertical synchronization signal Vsync and the horizontal synchronization signal Hsync can be omitted. The horizontal synchronization signal Hsync and the data enable signal DE have a period of one horizontal period (1H) (e.g., see FIG. 4).

The timing controller 130 generates a data timing control signal for controlling the operation timing of the data driver 110, a MUX control signal for controlling the operation timing of the de-multiplexer array 112, and a gate timing control signal for controlling the operation timing of the gate driver 120 based on the timing signals Vsync, Hsync, and DE received from the host system 200. The timing controller 130 synchronizes the data driver 110, the de-multiplexer array 112, the gate driver 120, and the voltage regulator 160 by controlling the operation timing of the display panel driving circuit.

The MUX control signal and the gate timing control signal output from timing controller 130 can be input to the de-multiplexer array 112 and the shift registers in the gate driver 120 through the level shifter 140. The level shifter 140 can convert a voltage of the MUX control signal received from the timing controller 130 to a swing width between the gate-on voltage and the gate-off voltage and supply it to the de-multiplexer array 112. The level shifter 140 can receive the gate timing control signal and generate a start pulse and a shift clock that swing between the gate-on voltage and the gate-off voltage to provide them to the gate driver 120.

The timing controller 130 can output a compensation gain for adjusting in real-time each of the voltages output from the power supply 150. The compensation gain is digital data including voltage level information for each of the voltages output from the power supply 150. The compensation gain generated by the timing controller 130 is input to the DAC 132 for power control, converted to an analog voltage, and output as a second voltage V2. The second voltage V2 output from the power control DAC 132 for power control is supplied to the voltage regulator 160.

The host system 200 can include a main board of any one of a television (TV) system, a set-top box, a navigation system, a personal computer (PC), an in-vehicle system, a mobile terminal, and a wearable terminal. The host system can scale an image signal from a video source to match the resolution of the display panel 100, and can transmit it to the timing controller 130 together with the timing signal.

In portable/small electronic devices such as mobile terminals or wearable terminals, the timing controller 130, the level shifter 140, the DAC 132 for power control, the power supply 150, the voltage regulator 160, the data driver 110, the touch sensor driver, etc. can be integrated into a single drive IC (DIC) as shown in FIG. 3.

In the portable/small electronic devices, the host system 200 can be implemented as an application processor (AP). The host system 200 can transmit pixel data of the input image to the drive IC (DIC) through a mobile Industry Processor Interface (MIPI). The host system 200 can be connected to the drive IC (DIC) via a flexible printed circuit, for example, a flexible printed circuit (FPC), as shown in FIG. 3. The drive IC can be attached on the display panel 100 in a COG (Chip on Glass) process.

Figure 4:
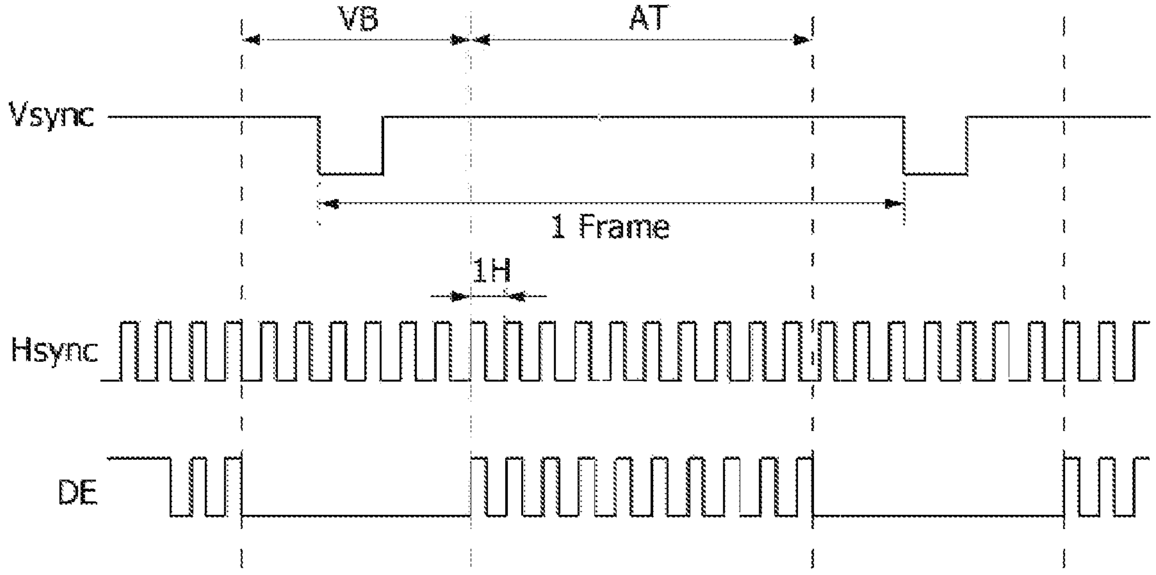
FIG. 4 is a diagram illustrating one frame period and one horizontal period according to an embodiment of the present disclosure.

FIG. 4 is a diagram illustrating one frame period and one horizontal period.

Referring to FIG. 4, the vertical synchronization signal Vsync, the horizontal synchronization signal Hsync, and the data enable signal DE are timing signals synchronized with the pixel data of the input image.

The vertical synchronization signal Vsync indicates one frame period. The horizontal synchronization signal Hsync indicates one horizontal period 1H. The data enable signal DE indicates an effective data section including pixel data to be written to the pixels. A pulse of the data enable signal DE is synchronized with the pixel data to be written to the pixels of the display panel 100. One pulse period of the data enable signal DE is one horizontal period 1H.

One frame period is divided into an active interval AT in which the pixel data of the input image is written to the pixels, and a vertical blank period VB having no pixel data. The vertical blank period VB is a blank period in which pixel data is not received by the timing controller 130 and the data driver 110 between an active interval AT of an (M−1)th (M being a natural number) frame period and an active interval AT of an Mth frame period. The active interval AT includes pixel data to be written in sub-pixels of all pixel lines L1 to Ln of the display panel 100.

The pixel circuit of each of the sub-pixels includes a light emitting element, a driving element that generates a current according to a gate-source voltage Vgs to drive the light emitting element, and a capacitor to maintain the gate-source voltage of the driving element. The driving element can be implemented as a transistor. In order to make the image quality of an entire screen of the organic light emitting display device uniform, it is preferable that the driving elements among all pixels have uniform electrical characteristics. However, due to device characteristic deviations and process deviations caused during the manufacturing process of the display panel 100, there may be differences in the electrical characteristics of the driving elements for some of the pixels, and such differences in electrical characteristics may become more pronounced over time as the driving time of the pixels becoming longer. Internal compensation technologies and/or external compensation technologies can be used to compensate for the deviations in the electrical characteristics and the variations of the driving elements for the pixels. In an internal compensation technology, a threshold voltage of a driving element is sensed for each sub-pixel to compensate the data voltage in real-time by the threshold voltage using a pixel circuit including an internal compensation circuit.

Figure 5:
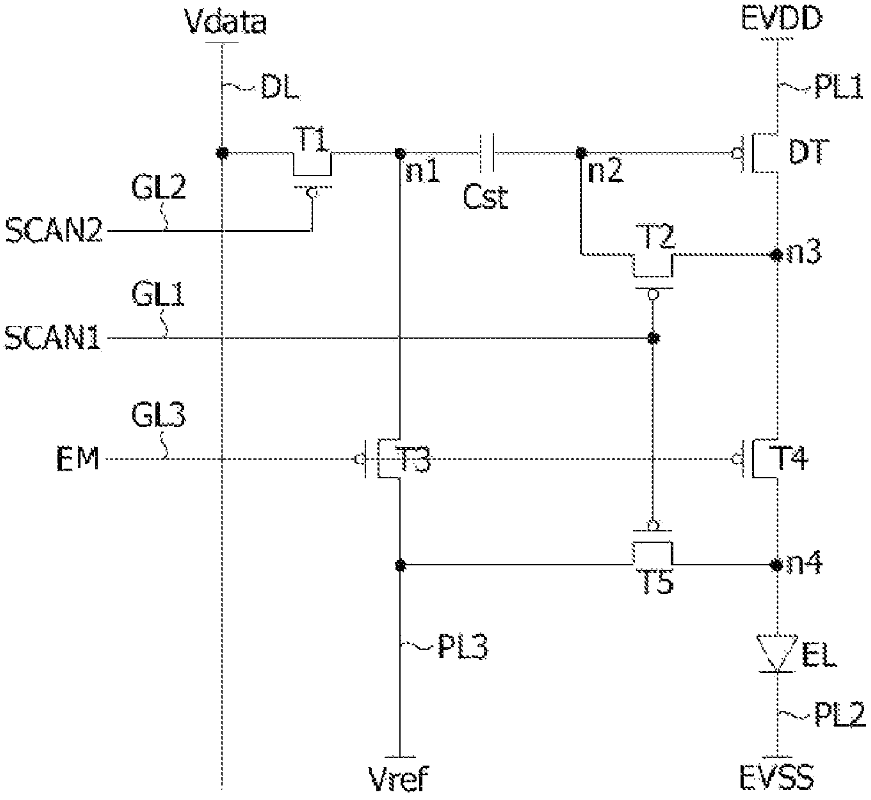
FIG. 5 is a circuit diagram illustrating an example of a pixel circuit applicable to a display device according to an embodiment of the present disclosure.
Figure 6:
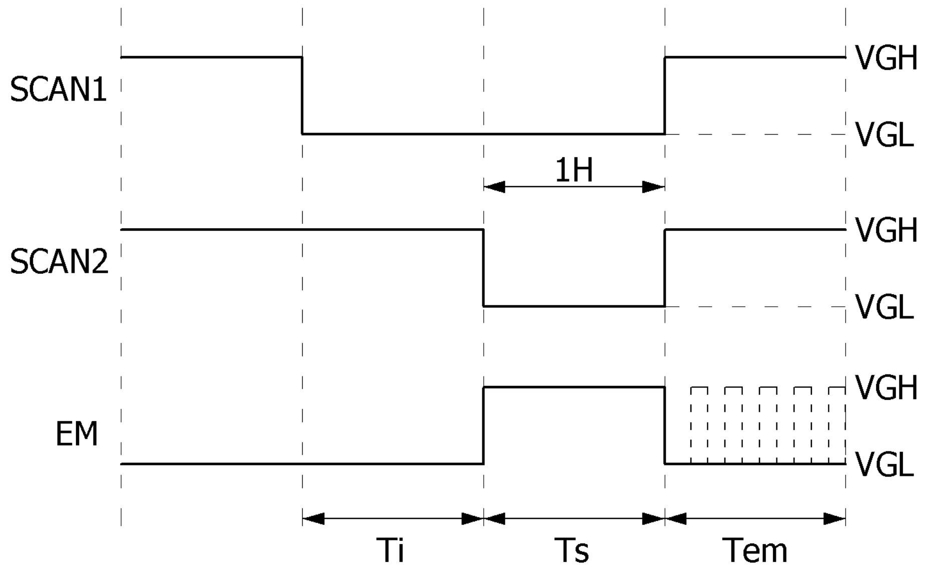
FIG. 6 is a waveform diagram illustrating waveforms of gate signals supplied to the pixel circuit shown in FIG. 5 according to an embodiment of the present disclosure.

FIG. 5 is a circuit diagram illustrating an example of a pixel circuit applicable to the display device according to one embodiment of the present disclosure. FIG. 6 is a waveform diagram illustrating waveforms of gate signals supplied to the pixel circuit shown in FIG. 5.

Referring to FIGS. 5 and 6, the pixel circuit of the present disclosure includes a light emitting element EL, a plurality of transistors T1 to T5 and DT, a capacitor Cst.

The transistors T1 to T5 and DT can be implemented as, but are not limited to, p-channel transistors. The transistors T1 to T5 and DT include switch elements T1 to T5 and a driving element DT. Each of the switch elements T1 to T5 can be turned on in response to a gate-on voltage VGL and turned off in response to a gate-off voltage VGH.

An operation period of the pixel circuit can be divided into an initialization period Ti during which main nodes n1 to n4 and the capacitor Cst are initialized, a sensing period Ts during which a data voltage Vdata of the pixel data compensated by an amount of a threshold voltage Vth of the driving element DT is charged to the capacitor Cst, and a light emission period Tem during which the light emitting element EL is driven by the driving element DT to emit light. As shown in FIG. 6, the initialization period Ti, the sensing period Ts, and the light emission period Tem can be determined by waveforms of the gate signals SCAN1, SCAN2, and EM.

The driving element DT drives the light emitting element EL to emit light by supplying current to the light emitting element EL according to the gate-source voltage Vgs. The driving element DT includes a gate electrode connected to a second node n2, a first electrode connected to a first power node PL1, and a second electrode connected to a third node n3. The pixel driving voltage EVDD is supplied to the pixels 101 in common via the first power line PL1.

The light emitting element EL can be implemented as an OLED. The light emitting element EL includes an anode electrode, a cathode electrode, and an organic compound layer formed between the electrodes. The anode electrode of the light emitting element EL is connected to a fourth node n4, and the cathode electrode is connected to a second power line PL2 to which a cathode voltage EVSS is applied. The organic compound layer can include, but is not limited to, a hole injection layer (HIL), a hole transport layer (HTL), a light emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this situation, visible light is emitted from the light emission layer EML. The light emitting element EL can be implemented as a tandem structure with a plurality of light emitting layers stacked on top of each other. The light emitting element EL having the tandem structure can improve the luminance and lifespan of pixels.

The capacitor Cst is connected between a first node n1 and the second node n2. The capacitor Cst is charged with a data voltage Vdata compensated by an amount of the threshold voltage Vth of the driving element DT. For example, the first node n1 can be connected to the first switch element T1, the third switch element T3 and one capacitor electrode of the capacitor Cst, and the second node n1 can be connected to a gate electrode of the driving element DT, the second switch element T2 and the other capacitor electrode of the capacitor Cst.

A first switch element T1 supplies the data voltage Vdata to the first node n1 in response to the gate-on voltage VGL of a second gate signal SCAN2. The first switch element T1 includes a gate electrode connected to a second gate line GL2, a first electrode connected to a data line DL, and a second electrode connected to the first node n1.

The second gate signal SCAN2 includes a pulse of the gate-on voltage VGL synchronized with the data voltage Vdata of the pixel data. The pulse of the second gate signal SCAN2 determines the sensing period Ts. During the initialization period Ti and the light emission period Tem, a voltage of the second gate signal SCAN2 remains at the gate-off voltage VGH. A pulse width of the second gate signal SCAN2 can be set to one horizontal period (1H). The pulse of the second gate signal SCAN2 can be generated as the gate-on voltage VGL later than a starting edge of a first gate signal SCAN1 and can be inverted to the gate-off voltage VGH at the same period as the first gate signal SCAN1. The pulse width of the second gate signal SCAN2 is set to be smaller than the pulse width of the first gate signal SCAN1.

A second switch element T2 connects the gate electrode of the driving element DT and the second electrode of the driving element DT in response to the gate-on voltage VGL of the first gate signal SCAN1 to cause the driving element DT to operate as a diode during the initialization period Ti and the sensing period Ts. The second switch element T2 includes a gate electrode connected to the first gate line GL1 to which the first gate signal SCAN1 is applied, a first electrode connected to the second node n2, and a second electrode connected to the third node n3.

The first gate signal SCAN1 can be generated as a pulse of the gate-on voltage VGL. A pulse of the first gate signal SCAN1 determines the initialization period Ti and the sensing period Ts. During the light emission period Tem, a voltage of the first gate signal SCAN1 remains at the gate-off voltage VGH.

A third switch element T3 supplies a reference voltage Vref to the first node n1 in response to the gate-on voltage VGL of a third gate signal EM. The reference voltage Vref is commonly supplied to the pixels 101 via a third power line PL3. The third switch element T3 includes a gate electrode connected to a third gate line GL3 to which the third gate signal EM is applied, a first electrode connected to the first node n1, and a second electrode connected to the third power line PL3.

The third gate signal EM includes a pulse of the gate-off voltage VGH. A pulse of the third gate signal EM turns off the third and fourth switch elements T3 and T4 during the sensing period Ts to block a current path between the first node n1 and the third power line PL3, and to block a current path between the third node n3 and the fourth node n4. For example, the gate electrodes of the third and fourth switch elements T3 and T4 are connected to each other and configured to receive the third gate signal EM. In order to accurately represent low grayscale luminance of the pixels, the third gate signal EM can be generated as a pulse width modulation (PWM) pulse having a duty ratio during the light emission period Tem. In this situation, a voltage of the third gate signal EM swings between the gate-on voltage VGL and the gate-off voltage VGH according to the duty ratio of the PWM pulse during the light emission period Tem.

The fourth switch element T4 forms a current path between the driving element DT and the light emitting element EL during the light emitting period Tem in response to the gate-on voltage VGL of the third gate signal EM. A gate electrode of the fourth switch element T4 is connected to the third gate line GL3. A first electrode of the fourth switch element T4 is connected to the third node n3, and a second electrode of the fourth switch element T4 is connected to the fourth node n4.

A fifth switch element T5 supplies the reference voltage Vref to the fourth node n4 during the initialization period Ti and the sensing period Ts in response to the gate-on voltage VGL of the first gate signal SCAN1. During the initialization period Ti and the sensing period Ts, a voltage of the anode electrode of the light emitting element EL is initialized to the reference voltage Vref. The light emitting element EL is not emit light yet because the voltage between the anode electrode and the cathode electrode is less than its threshold voltage during the initialization period Ti and the sensing period Ts. The fifth switch element T5 includes a gate electrode connected to the first gate line GL1, a first electrode connected to the third power line PL3, and a second electrode connected to the fourth node n4. For example, the gate electrodes of the second and fifth switch elements T2 and T5 are connected to each other and configured to receive the first gate signal SCAN1.

The display device according to embodiments of the present disclosure can improve image quality by varying the voltages or adjusting the voltages applied to the pixels, such as one or more of the pixel driving voltage EVDD, the reference voltage Vref, the cathode voltage EVSS, and the like can be dynamically changed or adjusted in real-time in order to improve image quality.

For example, at the beginning of power supply to the display device (e.g., when powering on the device) or when the scene of an input image changes rapidly (e.g., a fast action scene or a quick transition from a dark scene to a bright scene, and vice versa), a current I in the first power line PL1 to which the pixel driving voltage EVDD is applied and an amount of current fluctuation in a resistor R can increase, resulting in a large fluctuation in an IR drop Dop of the pixel driving voltage EVDD. When the pixel driving voltage EVDD is supplied to all pixels 101 as a constant voltage (or direct current voltage) that maintains a constant voltage level, the IR drop of the pixel driving voltage EVDD causes a fluctuation in a gate-source voltage Vgs of the driving element DT. The timing controller 130 controls the voltage regulator 160 to modulate the voltage level of the pixel driving voltage EVDD or the reference voltage Vref in a unit of one horizontal period (1H) based on an amount of grayscale variation for each of the pixel lines L1 to Ln, thereby preventing or minimizing the fluctuation in the gate-source voltage Vgs of the driving elements DT throughout the screen of the display area AA.

The timing controller 130 can improve a luminance decay phenomenon of the pixels by varying the voltage level of the pixel driving voltage EVDD or the reference voltage Vref in a unit of one horizontal period (1H) or during one horizontal period (1H) when the grayscale of the pixel data written to the pixels is changed or experiences a large transition event.

The timing controller 130 can calculate a grayscale change amount for each line and a frame grayscale change amount. During one horizontal period, the data voltage Vdata is charged to sub-pixels arranged on one pixel line to write pixel data. A grayscale value for a pixel line can be a representative grayscale value calculated as a total sum of the pixel data applied to one pixel line, an average value of the total sum, or a normalization value of the total sum. Here, different weights can be assigned to the pixel data for each color and grayscale of the sub-pixels. The grayscale change amount for each pixel line is an amount of change in the representative grayscale value for that pixel line. The frame grayscale value is a representative grayscale value of the pixel data written to all pixels during one frame period. The frame grayscale value can be calculated as a total sum or its average value of the grayscale change amount for each pixel line calculated on all pixel lines L1 to Ln during one frame period. The frame grayscale change amount is an amount of change in the frame grayscale value between frames.

As a result of analyzing the pixel data of the input image, the timing controller 130 can, gradually increase a value of the compensation gain data in a unit of one horizontal period (e.g., during 1H) during one frame period as the frame grayscale value increases. The voltage regulator 160 can increase the voltage commonly supplied to the pixel circuits in a unit of one horizontal period within one frame period. In this situation, the output voltage from the voltage regulator 160 can follow an exponential function slope curve between 1.8 and 2.6 during a fluctuation section of the output voltage.

As the frame grayscale value decreases, the timing controller 130 can gradually decrease the value of the compensation gain data in a unit of one horizontal period (e.g., during 1H) during one frame period. The voltage regulator 160 can decrease the voltage commonly supplied to the pixel circuits in a unit of a one horizontal period within one frame period. In this situation, the output voltage from the voltage regulator 160 can follow the exponential function slope curve between 1.8 and 2.6 during a fluctuation section of the output voltage.

Figure 7:
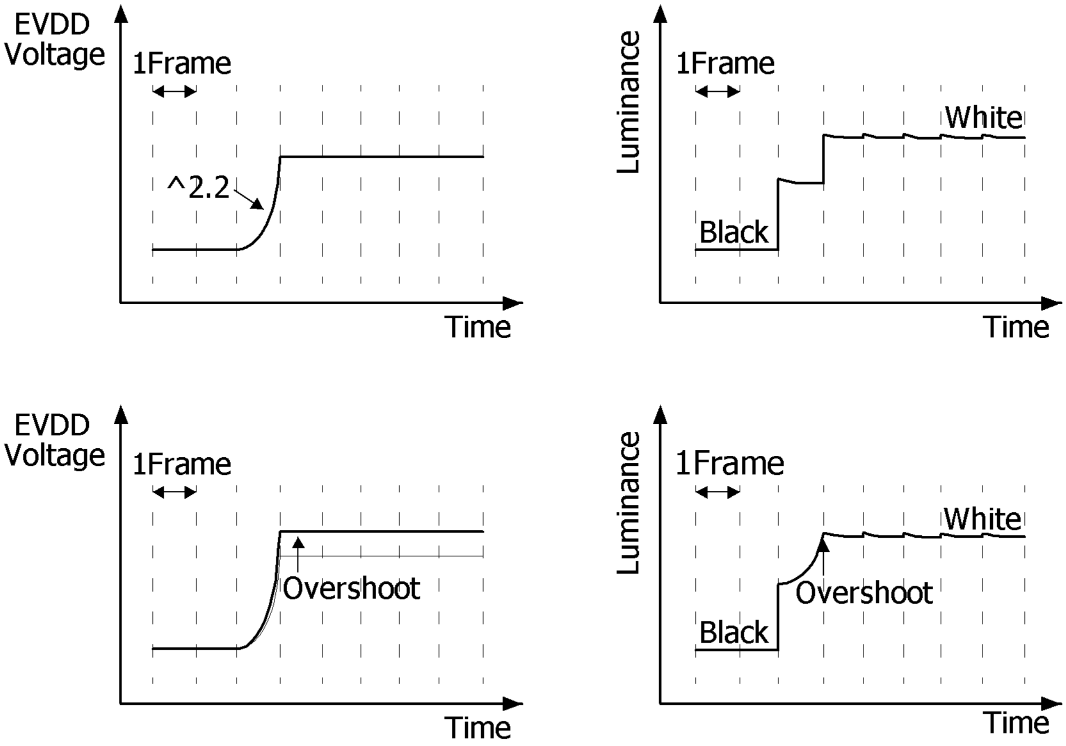
FIG. 7 is a diagram illustrating a pixel driving voltage and a luminance change of a pixel when a frame grayscale value is changed from a low grayscale to a high grayscale according to an embodiment of the present disclosure.

FIG. 7 is a diagram illustrating the pixel driving voltage EVDD and a luminance change of a pixel when the frame grayscale value is changed from a low grayscale to a high grayscale (e.g., when transitioning from black to white, or from a dark scene to a bright scene).

Figure 8:
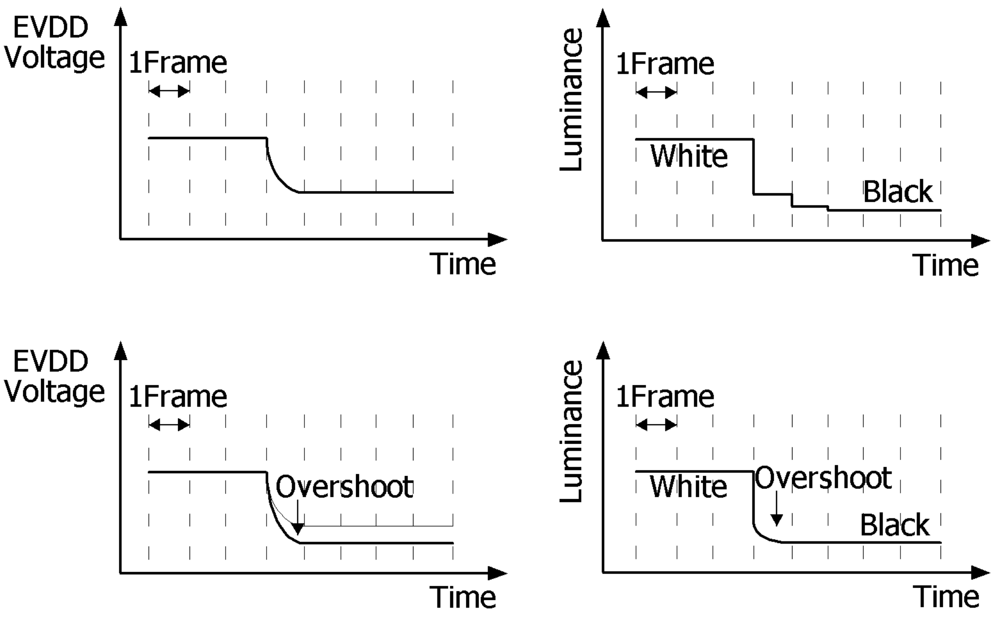
FIG. 8 is a diagram illustrating the change in a pixel driving voltage and a luminance of a pixel when a frame grayscale value is changed from high grayscale to low grayscale according to an embodiment of the present disclosure.

Referring to FIG. 7, the timing controller 130 can gradually increase the pixel driving voltage EVDD in during one horizontal period for a frame whose frame grayscale value is changed from a low grayscale (Black) to a high grayscale (White). Since the luminance of the pixels changes with respect to the 2.2 exponential gamma curve during one frame period to improve image quality, it is desirable that the pixel driving voltage EVDD is varied with a slope of an exponential function between 1.8 and 2.6. In the example of FIG. 8, the timing controller 130 can vary the compensation gain to a value that follows the slope of the 2.2 exponential function ^2.2 every horizontal period during one frame period so that the voltage of the pixel driving voltage EVDD is varied to a voltage that follows the slope of the 2.2 exponential function ^2.2. Here, 'x' exponential function can be represented by $L^x$, where 'L' is the luminance. If the luminance of a pixel does not reach a target luminance within one frame period when the frame grayscale value changes, the timing controller 130 can increase the voltage of the pixel driving voltage EVDD to a voltage 'Overshoot' that is greater than the target value by applying a weight to the compensation gain, thereby accelerating the response speed of the pixels, in order to maintain uniform image quality even when there are large image transitions (e.g., even when transitioning from black to white, or from a dark scene to a bright scene).

FIG. 8 is a diagram illustrating a pixel driving voltage EVDD and a luminance change of a pixel when a frame grayscale value is changed from a high grayscale to a low grayscale (e.g., from white to black, or from a bright scene to a dark scene).

Referring to FIG. 8, the timing controller 130 can gradually decrease the pixel driving voltage EVDD in a unit of one horizontal period for a frame whose frame grayscale value is changed from a high grayscale to a low grayscale. In this situation, the voltage of the pixel driving voltage EVDD can follow a slope of an exponential function between 1.8 exponential function and 2.6 exponential function. By applying a weight to the compensation gain, the timing controller 130 can decrease the voltage of the pixel driving voltage EVDD to a voltage 'Overshoot' that is lower than the target value to accelerate the response speed of the pixels. In this situation, since the voltage 'Overshoot' is set lower than the target value, it can also be referred to as a voltage "Undershoot."

Figure 9:
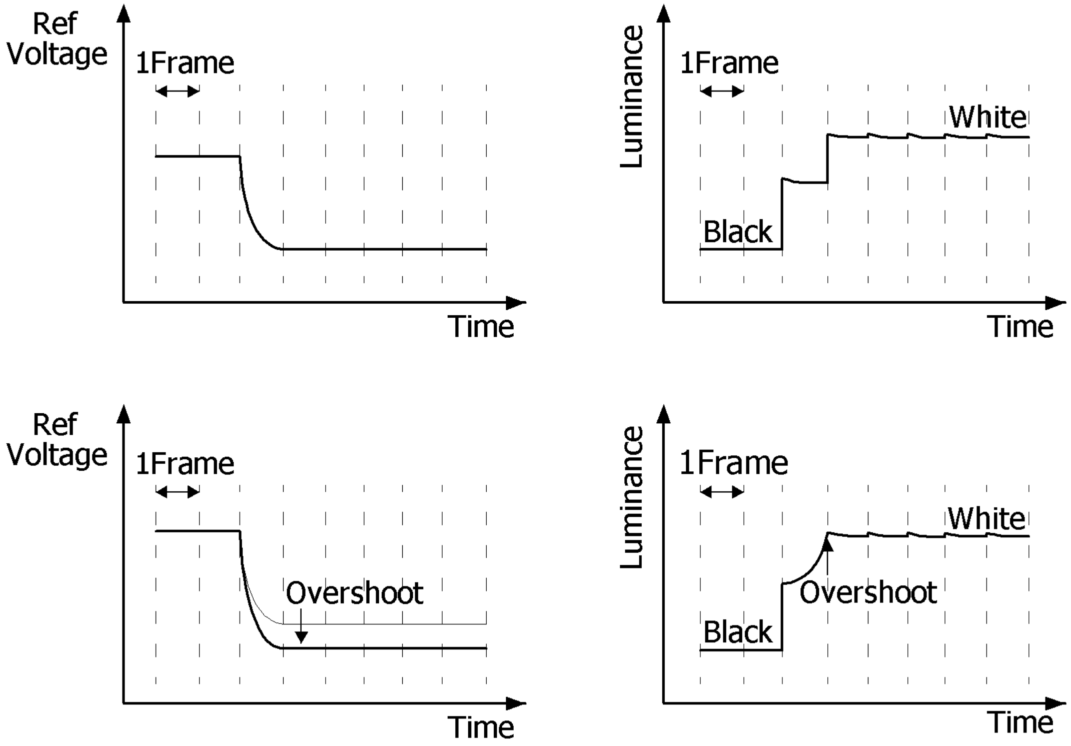
FIG. 9 is a diagram illustrating a reference voltage and a luminance change of a pixel when a frame grayscale value is changed from a low grayscale to a high grayscale according to an embodiment of the present disclosure.

To improve response characteristics of the pixels and suppress the luminance changes of the pixels, a voltage other than the pixel driving voltage EVDD, such as the reference voltage Vref, can be varied in a unit of one horizontal period (1H). For the pixel circuit illustrated in FIG. 5, the gate-source voltage Vgs of the driving element DT is affected by the reference voltage Vref. The timing controller 130 can compensate for the reference voltage Vref by an amount of an IR drop in the pixel driving voltage EVDD. In the pixel circuit illustrated in FIG. 5, the luminance of the pixel decreases as the reference voltage Vref increases, and the luminance of the pixel can increase as the reference voltage Vref decreases. Therefore, when the frame grayscale value changes, as shown in FIG. 9, the reference voltage Vref during one frame period has the same variation as a compensation method of the pixel driving voltage EVDD and the compensation direction therefor is opposite compared to the compensation method. For example, the reference voltage Vref can be dynamically changed or adjusted during one horizontal period (1H) in order to maintain uniform luminance and avoid an undesirable change in luminance.

FIG. 9 is a diagram illustrating a reference voltage and a luminance change of a pixel when a frame grayscale value is changed from a low grayscale to a high grayscale (e.g., when transitioning from black to white, or from a dark scene to a bright scene).

Referring to FIG. 9, the timing controller 130 can gradually decrease the reference voltage EVDD in a unit of one horizontal period in a frame whose frame grayscale value is changed from a low grayscale to a high grayscale. In this situation, it is preferable that the reference voltage Vref is varied by following the slope of the exponential function between 1.8 and 2.6. By applying a weight to the compensation gain, the timing controller 130 can reduce the voltage of the reference voltage Vref to a voltage 'Overshoot' that is lower than the target value to accelerate the response speed of the pixels.

The timing controller 130 can change the slope of the pixel driving voltage EVDD in fluctuation sections thereof depending on an amount of change between grayscales in the frame grayscale value.

Figure 10A:
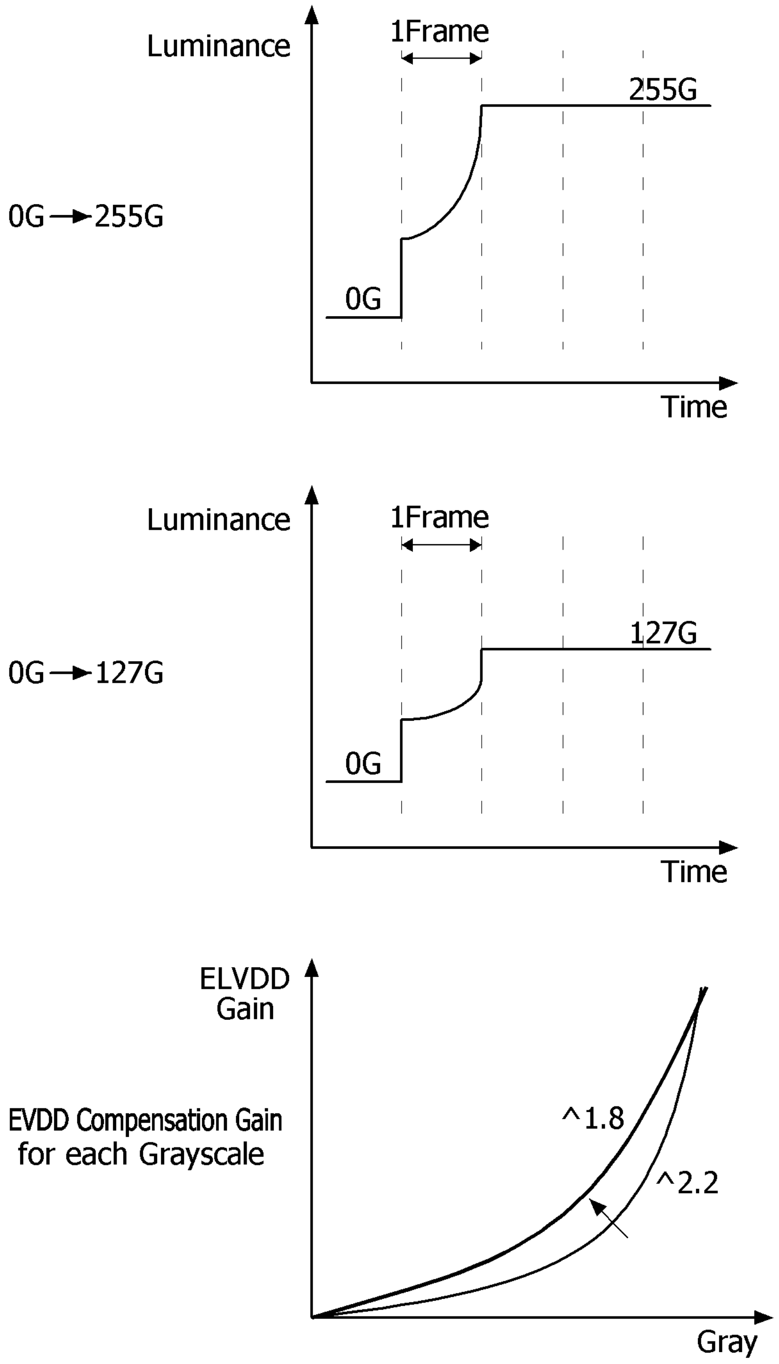
FIGS. 10A and 10B are diagrams illustrating an example in which a slope of a pixel driving voltage is varied in a fluctuation section of the pixel driving voltage according to an amount of change between grayscales according to an embodiment of the present disclosure.

When the frame grayscale value changes from 0G to a highest grayscale, e.g., 255G, the pixel luminance can reach the target luminance within one-frame period, whereas when the frame grayscale value changes from 0G to an intermediate grayscale, e.g., 127G, the pixel luminance may not reach the target luminance and thus the pixel luminance may not be compensated. In this situation, the timing controller 130 can change the pixel driving voltage EVDD to a voltage that follows a slope of the 2.2 exponential function ^2.2 during one frame period when the frame grayscale value changes from 0G to a higher grayscale, as shown in FIG. 10A, while changing the pixel driving voltage EVDD to a voltage that follows a slope of an exponential function lower than 2.2, for example, a 1.8 exponential function ^1.8 during a one-frame period when the frame grayscale value changes from 0G to an intermediate grayscale to accelerate the response speed of the pixel, as shown in FIG. 10A.

Figure 10B:
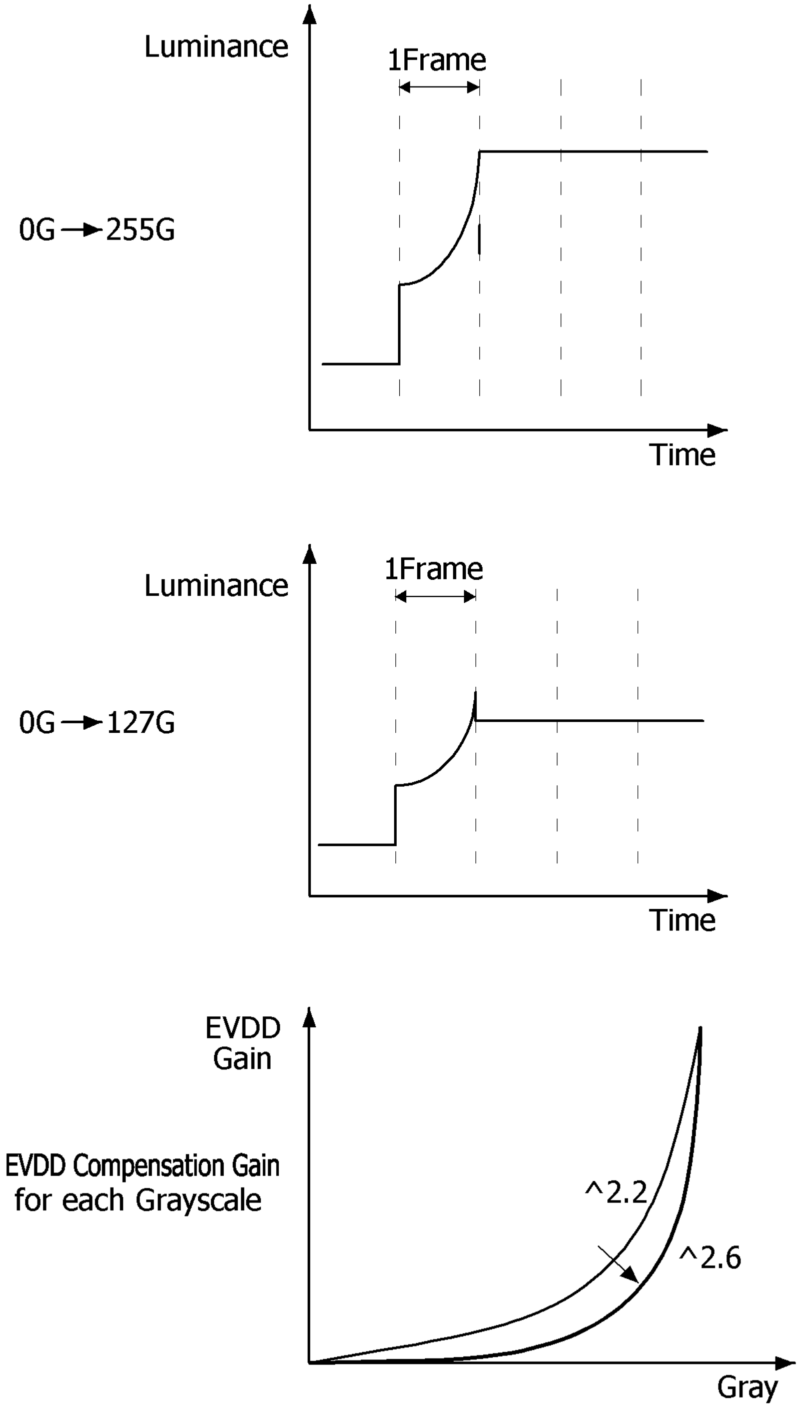

When the frame grayscale value changes from 0G to the highest grayscale, e.g., 255G, the pixel luminance reaches the target luminance within one frame period, while when the frame grayscale value changes from 0G to the intermediate grayscale, e.g., 127G, the pixel luminance can be overcompensated to a luminance higher than the target luminance. In this situation, the timing controller 130 can change the pixel driving voltage EVDD to a voltage that follows a slope of a 2.2 exponential function ^2.2 during one frame period when the frame grayscale value changes from 0G to a higher grayscale value, as shown in FIG. 10B, while changing the pixel driving voltage EVDD to a voltage that follows a slope of an exponential function higher than 2.2, for example, a 2.6 exponential function ^2.6 during one frame period when the frame grayscale value changes from 0G to an intermediate grayscale (e.g., 127G), as shown in FIG. 10B.

Figure 11:
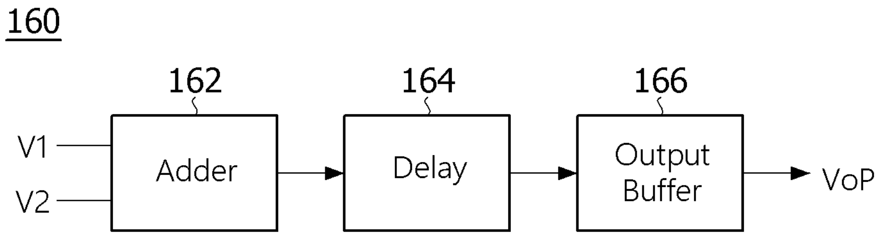
FIG. 11 is a block diagram illustrating a voltage regulator according to an embodiment of the present disclosure.

FIG. 11 is a block diagram illustrating the voltage regulator 160 according to one embodiment of the present disclosure.

Referring to FIG. 11, the voltage regulator 160 includes an adder 162 that receives a first voltage V1 and a second voltage V2 that is varied according to a compensation gain, a delay 164, and an output buffer 166.

The first voltage V1 input to the voltage regulator 160 can be at least one of the gate-source voltage Vgs of the driving element DT that drives the light emitting element EL in the pixel circuit, or a constant voltage that affects the luminance of the light emitting element EL, e.g., the pixel driving voltage EVDD, the cathode voltage EVSS, or the reference voltage Vref. Default voltage levels of the pixel driving voltage EVDD and the cathode voltage EVSS are set to voltage levels at which the driving element DT can operate in a saturation region. The pixel driving voltage EVDD is set to a default voltage level that is higher than the reference voltage Vref and the cathode voltage EVSS, and the reference voltage Vref can be set to a default voltage level that is higher than the cathode voltage EVSS (e.g., EVDD>Vref>EVSS). The default voltage level of the cathode voltage EVSS can be a negative polarity voltage. The default voltage level of the pixel driving voltage EVDD and the reference voltage Vref can be a positive polarity voltage.

The first voltage V1 can be set to the default voltage level of each of the pixel driving voltage EVDD, the cathode voltage EVSS, and the reference voltage Vref. The timing controller 130 outputs a compensation gain that is updated in a unit of one horizontal period based on a frame grayscale change amount obtained as a result of analyzing one frame of data. The compensation gain is input to the DAC 132 for power control and converted to the second voltage V2. A voltage of the second voltage V2 can be varied in a unit of one horizontal period by the compensation gain updated in a unit of one horizontal period (e.g., 1H). Thus, if the compensation gain value follows an exponential function curve, the second voltage V2 can be varied to a voltage that follows the exponential function curve in a fluctuation section of the second voltage V2.

Figure 12A:
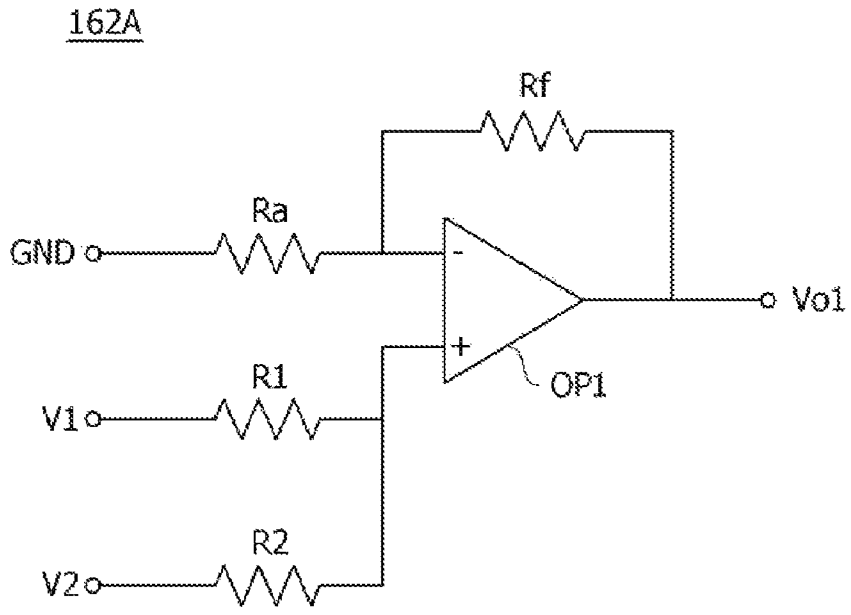
FIGS. 12A and 12B are circuit diagrams illustrating an adder in detail according to an embodiment of the present disclosure.
Figure 12B:
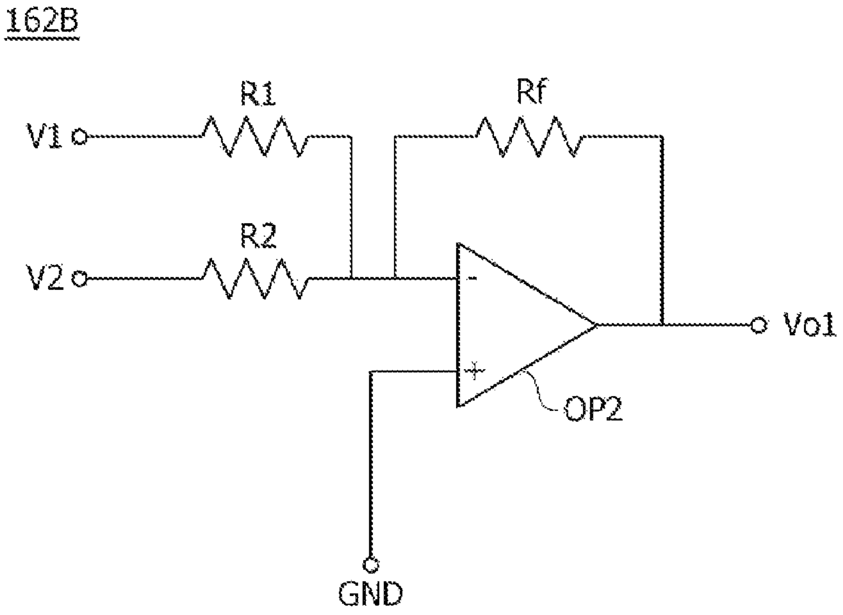

The adder 162 can include one or more of a first adder 162A shown in FIG. 12A and a second adder 162B shown in FIG. 12B.

Referring to FIG. 12A, the first adder 162A includes a first operational amplifier OP1, a resistor R1 connected between a first voltage V1 and a positive input terminal (+) of the first operational amplifier OP1, and a resistor R2 connected between a second voltage V2 and a positive input terminal (+) of the first operational amplifier OP1, a resistor Ra connected between a ground voltage GND and a negative input terminal (−) of the first operational amplifier OP1, and a resistor Rf connected between the negative input terminal (−) of the first operational amplifier OP1 and an output terminal of the first operational amplifier OP1.

The first adder 162A outputs an output voltage Vo1 obtained as a result of adding the first voltage V1 and the second voltage V2 to the delay 164, as shown in Equation 1 below.

$$Vo1 = \left(1 + \frac{R_f}{R_a}\right)\left(\frac{1}{R_1 + R_2}\right)(R_2V_1 + R_1V_2) \quad \text{[Equation 1]}$$

Referring to FIG. 12B, the second adder 162B includes a second operational amplifier OP2, a resistor R1 connected between the first voltage V1 and a negative input terminal (−) of the second operational amplifier OP2, a resistor R2 connected between the second voltage V2 and the negative input terminal (−) of the second operational amplifier OP2, and a resistor Rf connected between the negative input terminal (−) of the second operational amplifier OP2 and an output terminal of the second operational amplifier OP2. The positive input terminal (+) of the second operational amplifier OP2 is connected to a ground voltage GND.

The second adder 162B outputs an output voltage Vo1 obtained as a result of adding the first voltage V1 and the second voltage V2 to the delay 164, as shown in Equation 2 below.

$$Vo1 = -\left(\frac{R_f}{R_1}V_1 + \frac{R_f}{R_2}V_2\right) \quad \text{[Equation 2]}$$

The delay 164 is disposed between the adder 162 and the output buffer 166. The output voltage Vo1 of the adder 162 can be rapidly changed by the compensation gain. In this situation, the luminance of the pixels can be perceived as flicker. The delay 164 can delay the output voltage Vo1 of the adder 162 to gently decrease the slope of the waveform in the fluctuation section of the output voltage Vo1, thereby preventing the flicker caused by rapid changes in the luminance of the pixels.

Figure 13:
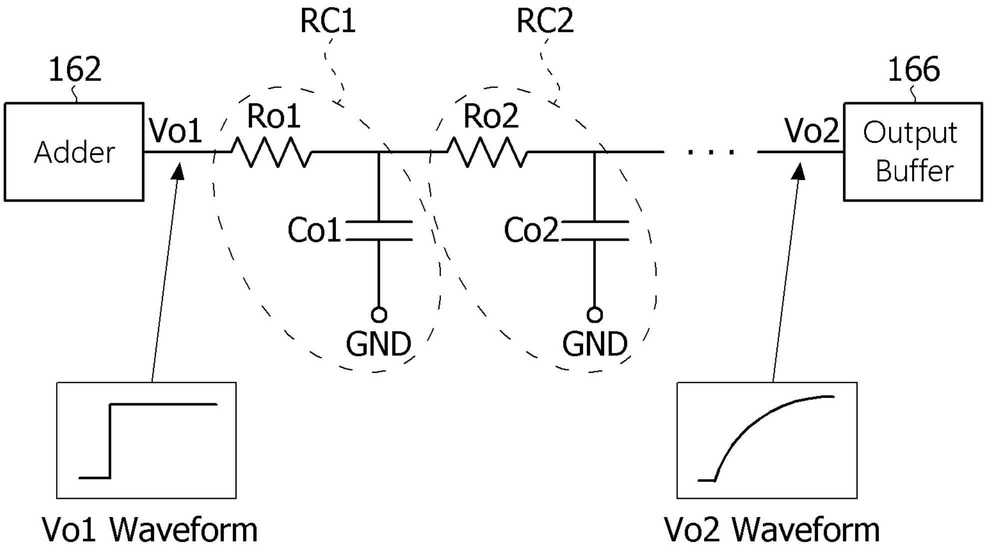
FIG. 13 is a block diagram illustrating a delay in detail according to an embodiment of the present disclosure.

The delay 164 can be implemented as a multi-RC delay circuit with two or more RC delay circuits RC1 and RC2 connected in series, as shown in FIG. 13.

Referring to FIG. 13, the multi-RC delay circuit includes a plurality of resistors Ro1 and Ro2 and a plurality of capacitors Co1 and Co2. The plurality of resistors Ro1 and Ro2 are connected in series between the adder 162 and the output buffer 166. The capacitors Co1 and Co2 are connected in parallel between the adder 162 and the output buffer 166. The resistors Ro1 and Ro2 are connected between the wirings connected in series and the ground voltage GND. An RC delay time of the multi-RC delay circuit should be within one frame period. When the RC delay time is longer than the one frame period, the response characteristics of the pixels between grayscales can be degraded.

The output voltage Vo2 of the delay 164 is supplied to the pixels 101 of the display panel 100 through the output buffer 166. The output buffer 166 can include a voltage follower to supply the output voltage Vo2 of the delay 164 to the display panel 100 as a final output voltage VoP.

Figure 14A:
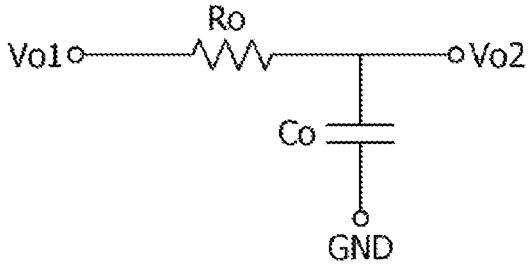
FIGS. 14A and 14B are circuit diagrams illustrating a single RC delay circuit and a multi-RC delay circuit, respectively, according to embodiments of the present disclosure.
Figure 14B:
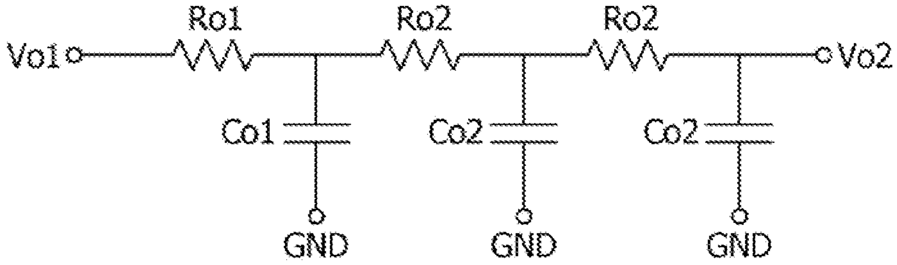
Figure 15:
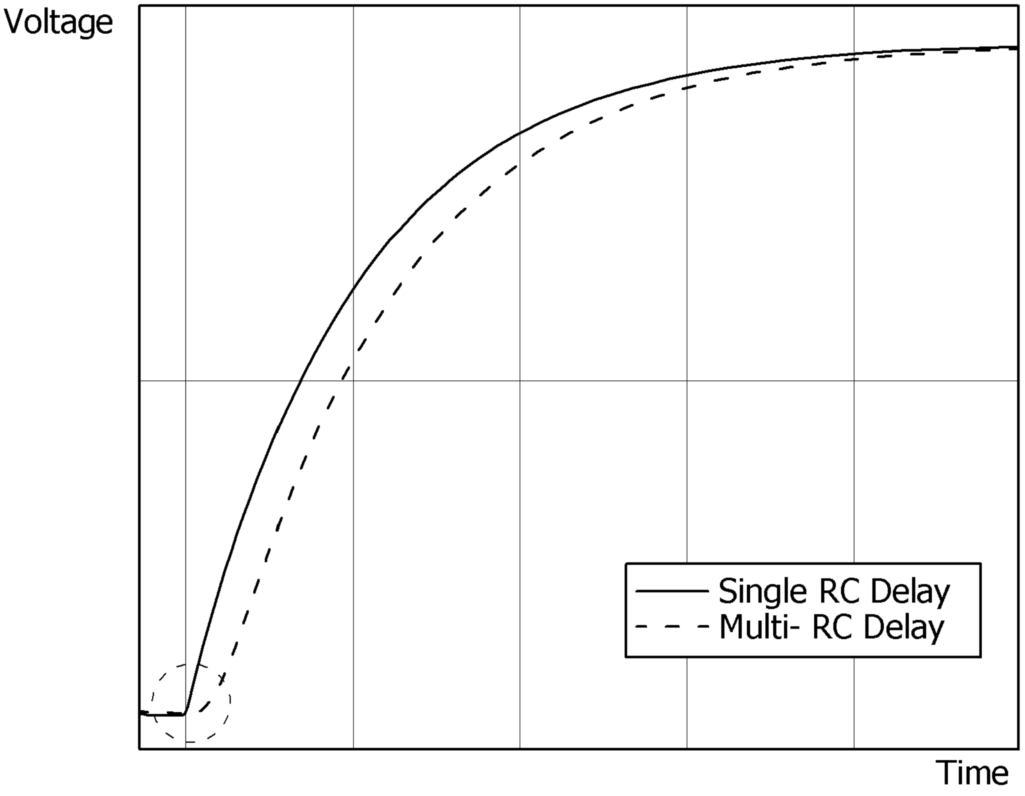
FIG. 15 is a diagram illustrating simulation results comparing the output waveforms of a single RC delay circuit and a multi-RC delay circuit, according to embodiments of the present disclosure.

This was confirmed by simulations for a single RC delay circuit shown in FIG. 14A and a multi-RC delay circuit shown in FIG. 14B. This simulation confirmed that the output waveforms of the single RC delay circuit and the multi-RC delay circuit have the same rising time. As can be seen from FIG. 15, the output waveform of the single RC delay circuit has a sharp change, which is most susceptible to flicker, while the output waveform of the multi-RC delay circuit has a more gentle slope, which is more favorable to prevent flicker. Therefore, it can be preferable to implement the delay 164 as the multi-RC delay circuit, but embodiments are not limited thereto. In FIG. 15, the horizontal axis represents time [msec], and the vertical axis represents voltage [V.]

Figure 16A:
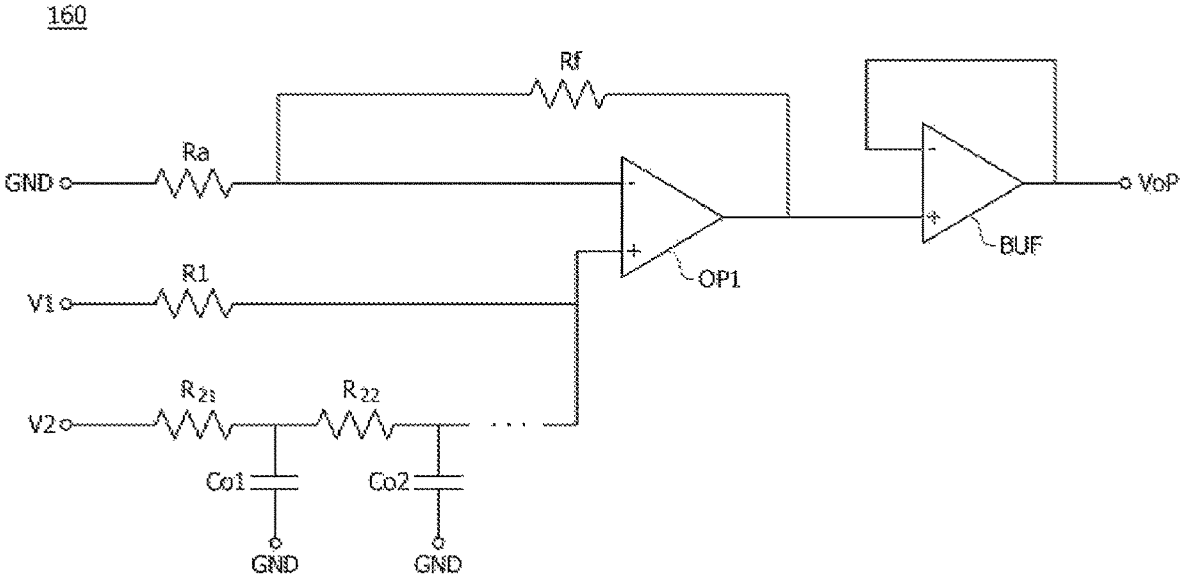
FIGS. 16A and 16B are circuit diagrams illustrating a multi-RC delay circuit connected to an input terminal of an adder according to an embodiment of the present disclosure.
Figure 16B:
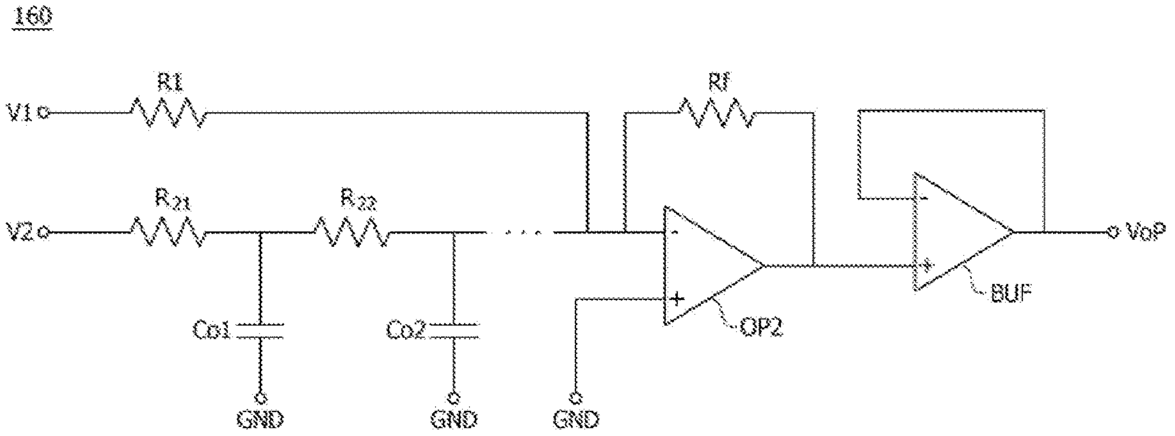

The multi-RC delay circuit can be combined with a resistor at the input terminal, to which the second voltage V2 is applied, in the adder 162, as shown in FIGS. 16A and 16B. FIG. 16A is a diagram illustrating a multi-RC delay circuit connected to the input terminal of the first adder shown in FIG. 12A. FIG. 16B is a diagram illustrating a multi-RC delay circuit connected to the input terminal of the second adder illustrated in FIG. 12B.

Referring to FIG. 16A, the voltage regulator 160 includes a first operational amplifier OP1, a resistor R1 connected between the first voltage V1 and a positive input terminal (+) of the first operational amplifier OP1, a multi-RC delay circuit R21, R22 . . . , C01, C02 . . . connected between the second voltage V2 and a positive input terminal (+) of the first operational amplifier OP1, a resistor Ra connected between a ground voltage GND and a negative input terminal (−) of the first operational amplifier OP1, a resistor Rf connected between the negative input terminal (−) of the first operational amplifier OP1 and an output terminal of the first operational amplifier OP1, and an output buffer BUF connected to an output terminal of the first operational amplifier OP1. The output buffer BUF is a voltage follower including a second operational amplifier.

In FIG. 16A, an output voltage VoP from the voltage regulator 160 is as shown in Equation 3 below.

$$VoP = \left(1 + \frac{R_f}{R_a}\right)\left(\frac{1}{R_1 + (R_{21} + R_{22} + \ldots)}\right)((R_{21} + R_{22} + \ldots)V_1 + R_1 V_2) \quad \text{[Equation 3]}$$

Referring to FIG. 16B, the voltage regulator 160 includes a second operational amplifier OP2, a resistor R1 connected between the first voltage V1 and a negative input terminal (−) of the second operational amplifier OP2, a multi-RC delay circuit R21, R22 . . . , C01, C02 . . . , a resistor Rf connected between the negative input terminal (−) of the second operational amplifier OP2 and an output terminal of the second operational amplifier OP2, and an output buffer BUF connected to the output terminal of the second operational amplifier OP2. The positive input terminal (+) of the second operational amplifier OP2 is connected to a ground voltage GND.

In FIG. 16B, an output voltage VoP from the voltage regulator 160 is as shown in Equation 4 below.

$$VoP = -\left(\frac{R_f}{R_1}V_1 + \frac{R_f}{(R_{21} + R_{22} + \ldots)}V_2\right) \quad \text{[Equation 4]}$$

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A power circuit comprising:
a direct current to direct current converter configured to output a first voltage;
a digital-to-analog converter configured to convert input data to an analog voltage and output a second voltage; and
a voltage regulating circuit configured to receive the first voltage and the second voltage as inputs and output a voltage in which the second voltage is added to the first voltage, and reduce a slope of the voltage,
wherein the input data to the digital-to-analog converter is updated during one horizontal period of a display device, and
wherein the voltage regulating circuit is further configured to commonly supply the voltage to pixels of the display device.

2. The power circuit of claim 1, wherein the first voltage is at least one of a gate-source voltage of a driving element that drives a light emitting element, a pixel driving voltage, a cathode voltage or a reference voltage.

3. The power circuit of claim 1, wherein the voltage regulating circuit includes:
an adder configured to receive the first voltage and the second voltage as inputs;
a delay configured to delay an output voltage from the adder; and
an output buffer configured to transfer the output voltage from the delay to the pixels.

4. The power circuit of claim 3, wherein the delay includes a multi-RC delay circuit including a plurality of resistors and a plurality of capacitors.

5. The power circuit of claim 1, wherein the voltage regulating circuit includes:
an adder configured to receive the first voltage and the second voltage as inputs;
a delay connected to an input terminal of the adder configured to receive the second voltage; and
an output buffer configured to transfer an output voltage from the adder to the pixels.

6. The power circuit of claim 5, wherein the delay includes a multi-RC delay circuit including a plurality of resistors and a plurality of capacitors.

7. A display device comprising:
a display panel including a plurality of pixel circuits;
a controller configured to output compensation gain data;
a digital-to-analog converter configured to convert the compensation gain data to an analog voltage and to output a second voltage;
a direct current to direct current converter configured to output a first voltage; and
a voltage regulating circuit configured to receive the first voltage and the second voltage as inputs and output a voltage in which the second voltage is added to the first voltage, and reduce a slope of the voltage,
wherein the compensation gain data is updated during one horizontal period, and
wherein the voltage output from the voltage regulating circuit is commonly supplied to the plurality of pixel circuits.

8. The display device of claim 7, wherein each of the plurality of pixel circuits is configured to receive a pixel driving voltage, a reference voltage, and a cathode voltage; and
wherein the voltage output from the voltage regulating circuit is at least one of the pixel driving voltage, the reference voltage, and the pixel reference voltage.

9. The display device of claim 7, wherein the controller is further configured to increase the compensation gain data during one horizontal period during one frame period when a frame grayscale value increases, and
wherein the voltage regulating circuit is further configured to increase the voltage supplied to the plurality of pixel circuits during the one horizontal period within the one frame period.

10. The display device of claim 9, wherein the controller is further configured to decrease the compensation gain data during the one horizontal period during one frame period when the frame grayscale value decreases, and
wherein the voltage regulating circuit is further configured to decrease the voltage supplied to the plurality of pixel circuits during the one horizontal period within the one frame period.

11. The display device of claim 7, wherein the voltage output from the voltage regulating circuit follows an exponential function slope curve value of 1.8 to 2.6.

12. The display device of claim 11, wherein the voltage output from the voltage regulating circuit follows an exponential function slope curve value of 2.2.

13. The display device of claim 7, wherein the controller is further configured to change a slope of the voltage output from the voltage regulating circuit during a fluctuation section according to an amount of change between grayscales in a frame grayscale value.

14. The display device of claim 13, wherein the voltage regulating circuit is configured to:
increase the voltage by following a slope of a 2.2 exponential function when the frame grayscale value is changed from a lowest grayscale value to a highest grayscale value, and
increase the voltage by following a slope of an exponential function having a value greater or lesser than a 2.2 when the frame grayscale value is changed from a lowest grayscale value to an intermediate grayscale value.

15. The display device of claim 7, wherein the voltage regulating circuit includes:
an adder configured to receive the first voltage and the second voltage as inputs;
a multi-RC delay circuit configured to delay an output voltage of the adder; and
an output buffer configured to transfer an output voltage from the multi-RC delay circuit to the plurality of pixel circuits.

16. The display device of claim 7, wherein the voltage regulating circuit includes:
an adder configured to receive the first voltage and the second voltage as inputs;
a multi-RC delay circuit connected to an input terminal of the adder configured to receive the second voltage; and
an output buffer configured to transfer an output voltage from the adder to the plurality of pixel circuits.

17. A method of controlling a display device, the method comprising:
receiving a first pixel voltage;
receiving a second compensation gain voltage;
adding the first pixel voltage and the second compensation gain voltage to generate an output voltage;
delaying the output voltage according to a first slope function during the one horizontal period; and
supplying the output voltage to at least one pixel circuit of the display device,
wherein the output voltage changes during one horizontal period in one frame period, and wherein the first slope function is based on an exponential function.

18. The method of claim 17, wherein the first pixel voltage is at least one of a pixel driving voltage, a reference voltage and a cathode voltage.

* * * * *